US009066079B2

(12) United States Patent
Chiang et al.

(10) Patent No.: US 9,066,079 B2
(45) Date of Patent: Jun. 23, 2015

(54) METHOD OF STORING A CONTENT OF A THREE-DIMENSIONAL IMAGE

(71) Applicant: Chunghwa Picture Tubes, Ltd., Taoyuan (TW)

(72) Inventors: Chih-Yin Chiang, Nantou County (TW); Che-Wei Chang, Taoyuan County (TW)

(73) Assignee: Chunghwa Picture Tubes, Ltd., Longtan Dist., Taoyuan (TW)

( * ) Notice: Subject to any disclaimer, the term of this patent is extended or adjusted under 35 U.S.C. 154(b) by 138 days.

(21) Appl. No.: 13/952,669

(22) Filed: Jul. 28, 2013

(65) Prior Publication Data

US 2014/0376803 A1 Dec. 25, 2014

(30) Foreign Application Priority Data

Jun. 25, 2013 (TW) .............................. 102122560 A

(51) Int. Cl.
*H04N 19/93* (2014.01)
*H04N 13/00* (2006.01)

(52) U.S. Cl.
CPC ........... *H04N 13/0029* (2013.01); *H04N 19/93* (2014.11); *H04N 2213/003* (2013.01)

(58) Field of Classification Search
None
See application file for complete search history.

(56) References Cited

U.S. PATENT DOCUMENTS

| 6,144,028 | A  | * | 11/2000 | Kley ............................ 250/234 |
| 6,411,295 | B1 | * | 6/2002  | Hung et al. ................... 345/422 |
| 7,053,937 | B1 | * | 5/2006  | Aoki ......................... 348/231.3 |
| 2007/0098271 | A1 | * | 5/2007  | Kamata ........................ 382/232 |
| 2010/0092038 | A1 | * | 4/2010  | Theodore et al. .............. 382/103 |
| 2010/0310155 | A1 | * | 12/2010 | Newton et al. ................ 382/154 |
| 2011/0182498 | A1 |   | 7/2011  | Morifuji |
| 2012/0314028 | A1 | * | 12/2012 | Bruls ............................. 348/43 |
| 2012/0321171 | A1 | * | 12/2012 | Ito et al. ...................... 382/154 |
| 2013/0009955 | A1 | * | 1/2013  | Woo et al. .................... 345/419 |
| 2013/0177237 | A1 | * | 7/2013  | Schamp ....................... 382/154 |
| 2014/0002593 | A1 | * | 1/2014  | Zhang et al. ................... 348/42 |

* cited by examiner

*Primary Examiner* — Randolph I Chu
*Assistant Examiner* — Nathan Bloom
(74) *Attorney, Agent, or Firm* — Winston Hsu; Scott Margo

(57) ABSTRACT

A method of storing a content of a three-dimensional image includes a processor initializing a register and a maximum number; the processor utilizing a stereo comparison algorithm to generate a depth information map corresponding to each frame of a three-dimensional image signal; the processor obtaining a depth value corresponding to each pixel of each pixel row of the depth information map from the depth information map; the processor generating at least one depth vector corresponding to the pixel row according to a depth value corresponding to each pixel of the pixel row; a counter counting a number of the at least one depth vector; the processor storing the number of the at least one depth vector in the register; the processor comparing the number of the at least one depth vector with the maximum number; and the processor executing a corresponding operation on the register according to a comparison result.

5 Claims, 9 Drawing Sheets

METHOD OF STORING A CONTENT OF A THREE-DIMENSIONAL IMAGE

BACKGROUND OF THE INVENTION

1. Field of the Invention

The present invention relates to a method of storing a content of a three-dimensional image, and particularly to a method of storing a content of a three-dimensional image that can utilizes a processor that can compress bits for storing a depth information map according to a depth information map corresponding to each frame of a three-dimensional image signal.

2. Description of the Prior Art

Generally speaking, three-dimensional image formats can be divided into a side-by-side three-dimensional image format, a top-and-bottom three-dimensional image format, a frame packing three-dimensional image format, and a two-dimensional image plus depth information three-dimensional image format, where the side-by-side three-dimensional image format can be further divided into a side-by-side-full (LR-full) three-dimensional image format and a side-by-side-half (LR-half) three-dimensional image format.

As shown in FIG. 1, each frame of the LR-full three-dimensional image format includes a left eye image and a right eye image, where sizes of the left eye image and the right eye image of the LR-full three-dimensional image format are equal to size of a normal two-dimensional image. Therefore, storage space occupied by each frame of the LR-full three-dimensional image format is two times storage space for storing a normal two-dimensional image.

As shown in FIG. 2, each frame of the LR-half three-dimensional image format also includes a left eye image and a right eye image, where horizontal size of each of the left eye image and the right eye image is decreased to 50% and vertical size of each of the left eye image and the right eye image is not changed. Therefore, storage space occupied by each frame of the LR-half three-dimensional image format is equal to storage space for storing a normal two-dimensional image, but resolution of the LR-half three-dimensional image format is a half of resolution of a normal two-dimensional image.

As shown in FIG. 3, each frame of the top-and-bottom three-dimensional image format includes a left eye image and a right eye image from the top down, respectively, where vertical size of each of the left eye image and the right eye image is decreased to 50% and horizontal size of each of the left eye image and the right eye image is not changed. Therefore, storage space occupied by each frame of the top-and-bottom three-dimensional image format is equal to storage space for storing a normal two-dimensional image, but resolution of the top-and-bottom three-dimensional image format is a half of resolution of a normal two-dimensional image.

As shown in FIG. 4, a difference between each frame of the frame packing three-dimensional image format and each frame of the top-and-bottom three-dimensional image format is that sizes of a left eye image and a right eye image included in each frame of the frame packing three-dimensional image format is equal to size of a normal two-dimensional image, and a 45-pixel black frame existing between a left eye image and a right eye image included in each frame of the frame packing three-dimensional image format. Therefore, storage space occupied by each frame of the frame packing three-dimensional image format is equal to a sum of two times storage space for storing a normal two-dimensional image and storage space for storing a 45-pixel black frame.

As shown in FIG. 5, an arrangement method of the two-dimensional image plus depth information three-dimensional image format is the same as an arrangement method of the side-by-side three-dimensional image format, but a left side image of each frame of the two-dimensional image plus depth information three-dimensional image format is a normal two-dimensional image and a right side image of each frame of the two-dimensional image plus depth information three-dimensional image format is gray-level depth information map. Therefore, storage space occupied by each frame of the two-dimensional image plus depth information three-dimensional image format is two times storage space for storing a normal two-dimensional image.

To sum up, the above mentioned three-dimensional image formats provided by the prior art either need larger storage space or have poorer resolution. Therefore, how to compress the above mentioned three-dimensional image formats provided by the prior art and not to reduce resolution of the above mentioned three-dimensional image formats provided by the prior art is an important issue for a designer of a play device or a storage device.

SUMMARY OF THE INVENTION

An embodiment provides a method of storing a content of a three-dimensional image. The method includes the following steps: a processor initializing a register and a maximum number; the processor utilizing a stereo comparison algorithm to generate a depth information map corresponding to each frame of a three-dimensional image signal; the processor obtaining a depth value corresponding to each pixel of each pixel row of the depth information map from the depth information map corresponding to the frame of the three-dimensional image signal; the processor generating at least one depth vector corresponding to the pixel row according to a depth value corresponding to each pixel of the pixel row, where each depth vector of the at least one depth vector comprises at least one pixel, and each pixel of the at least one pixel has the same depth value; a counter counting a number of the at least one depth vector; the processor storing the number of the at least one depth vector to the register; the processor comparing the number of the at least one depth vector with the maximum number; and the processor executing a corresponding operation on the register according to a comparison result.

The present invention provides a method of storing a content of a three-dimensional image. The method utilizes a processor to obtain a depth value corresponding to each pixel of each pixel row of a depth information map corresponding to each frame of a three-dimensional image signal, and generate at least one depth vector corresponding to each pixel row of the depth information map according to a depth value corresponding to each pixel of each pixel row of the depth information map. Compared to the prior art, because each pixel row of the depth information map of the present invention can be represented by at least one depth vector, the present invention can significantly compress bits for storing the depth information map to reduce cost of storing the content of the three-dimensional image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
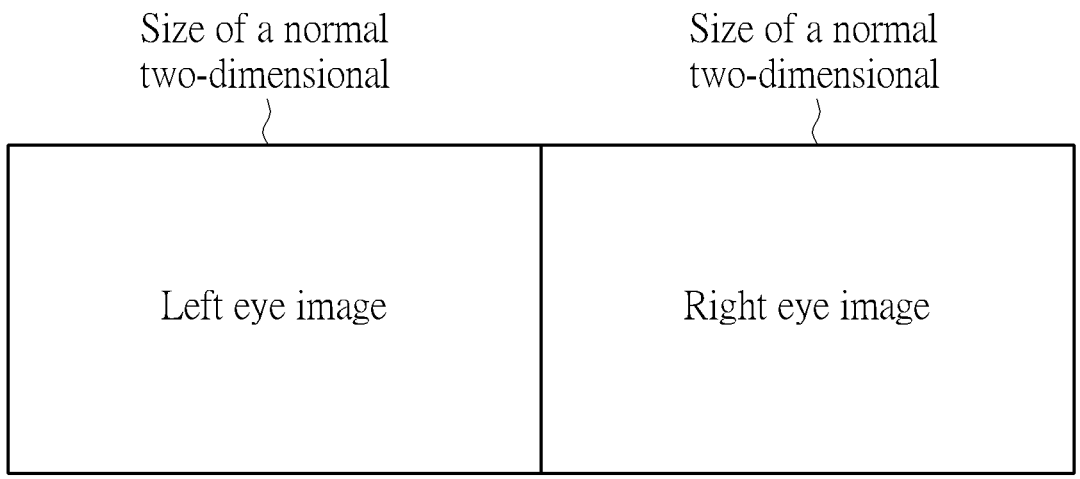
FIG. 1 is a diagram illustrating a side-by-side-full three-dimensional image format.
Figure 2:
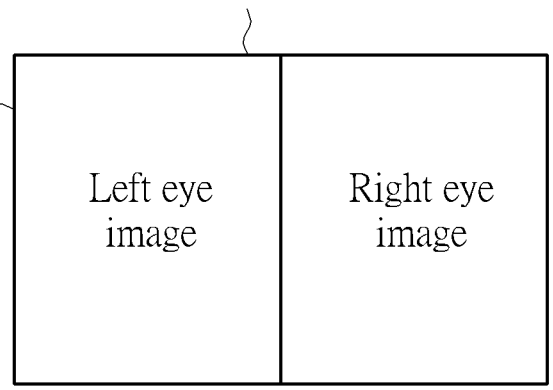
FIG. 2 is a diagram illustrating a side-by-side-half three-dimensional image format.
Figure 3:
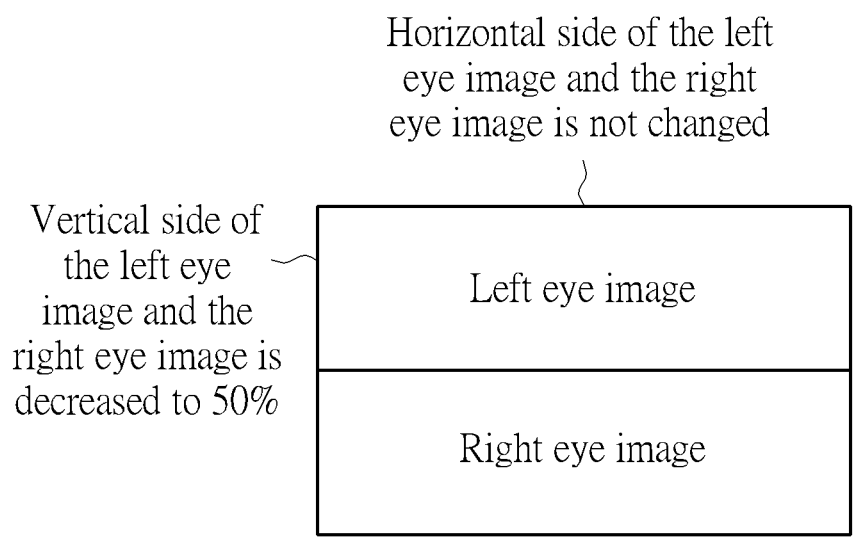
FIG. 3 is a diagram illustrating a top-and-bottom three-dimensional image format.
Figure 4:
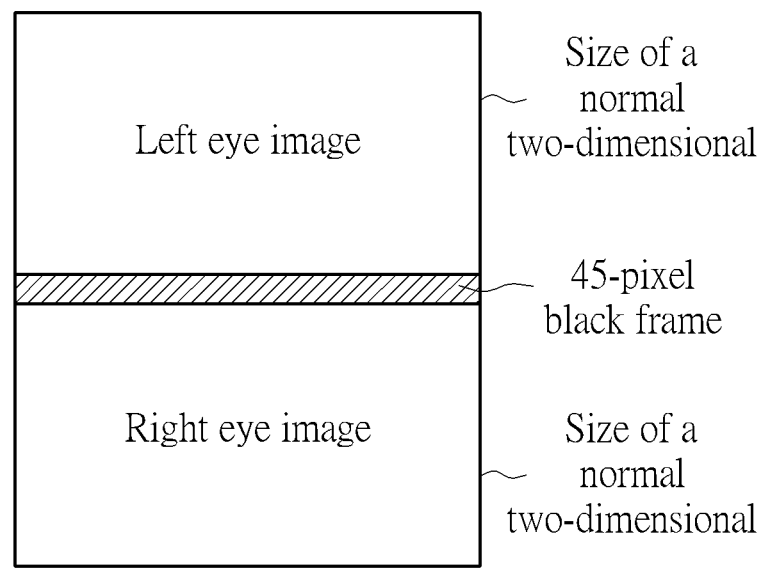
FIG. 4 is a diagram illustrating a frame packing three-dimensional image format.
Figure 5:
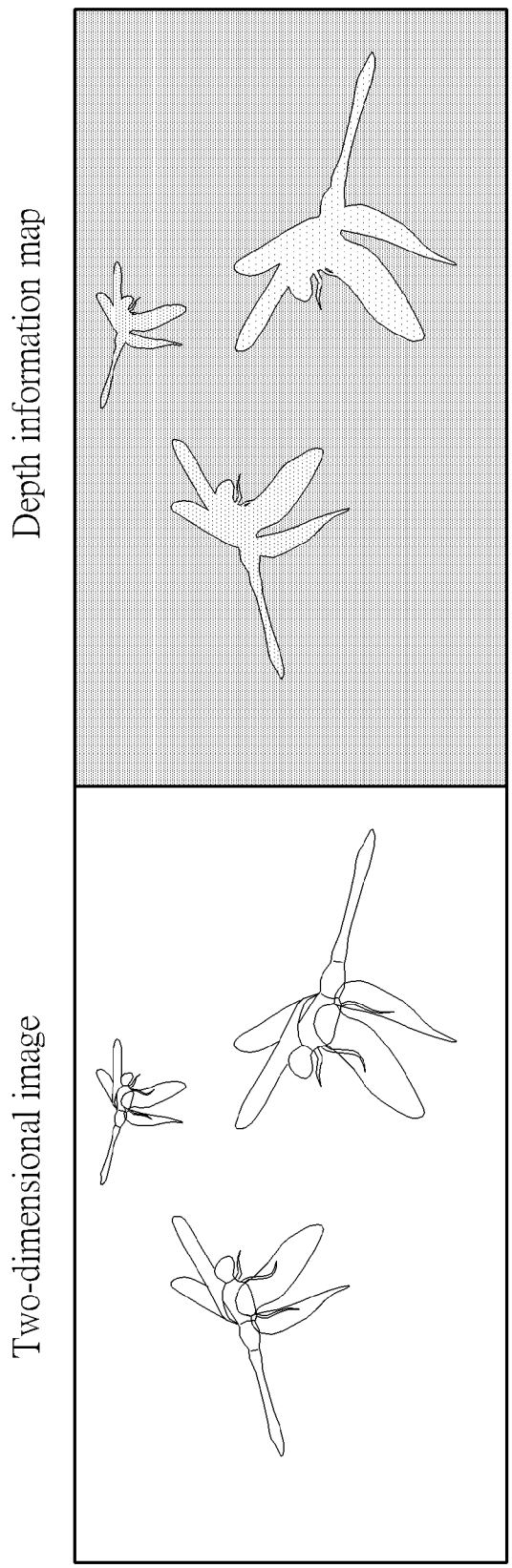
FIG. 5 is a diagram illustrating a two-dimensional image plus depth information three-dimensional image format.
Figure 6:
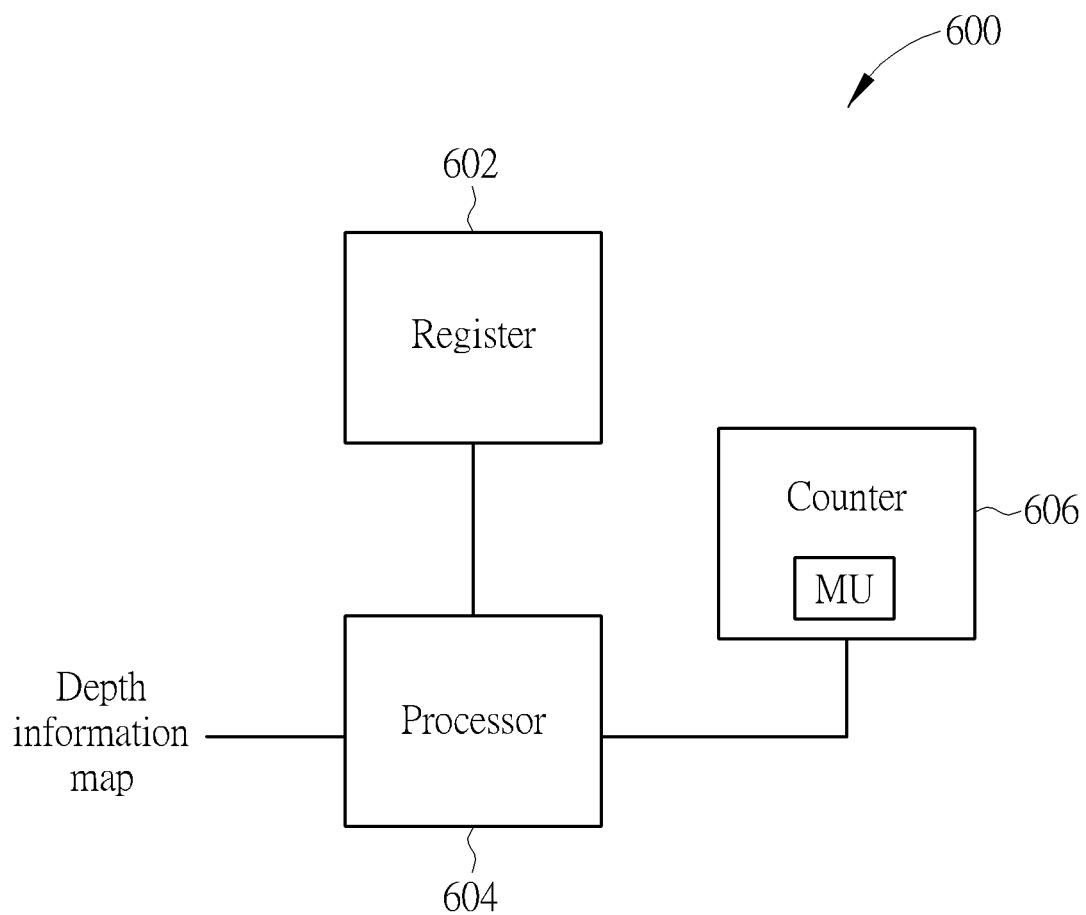
FIG. 6 is a diagram illustrating a device for storing a content of a three-dimensional image according to an embodiment.
Figure 7A:
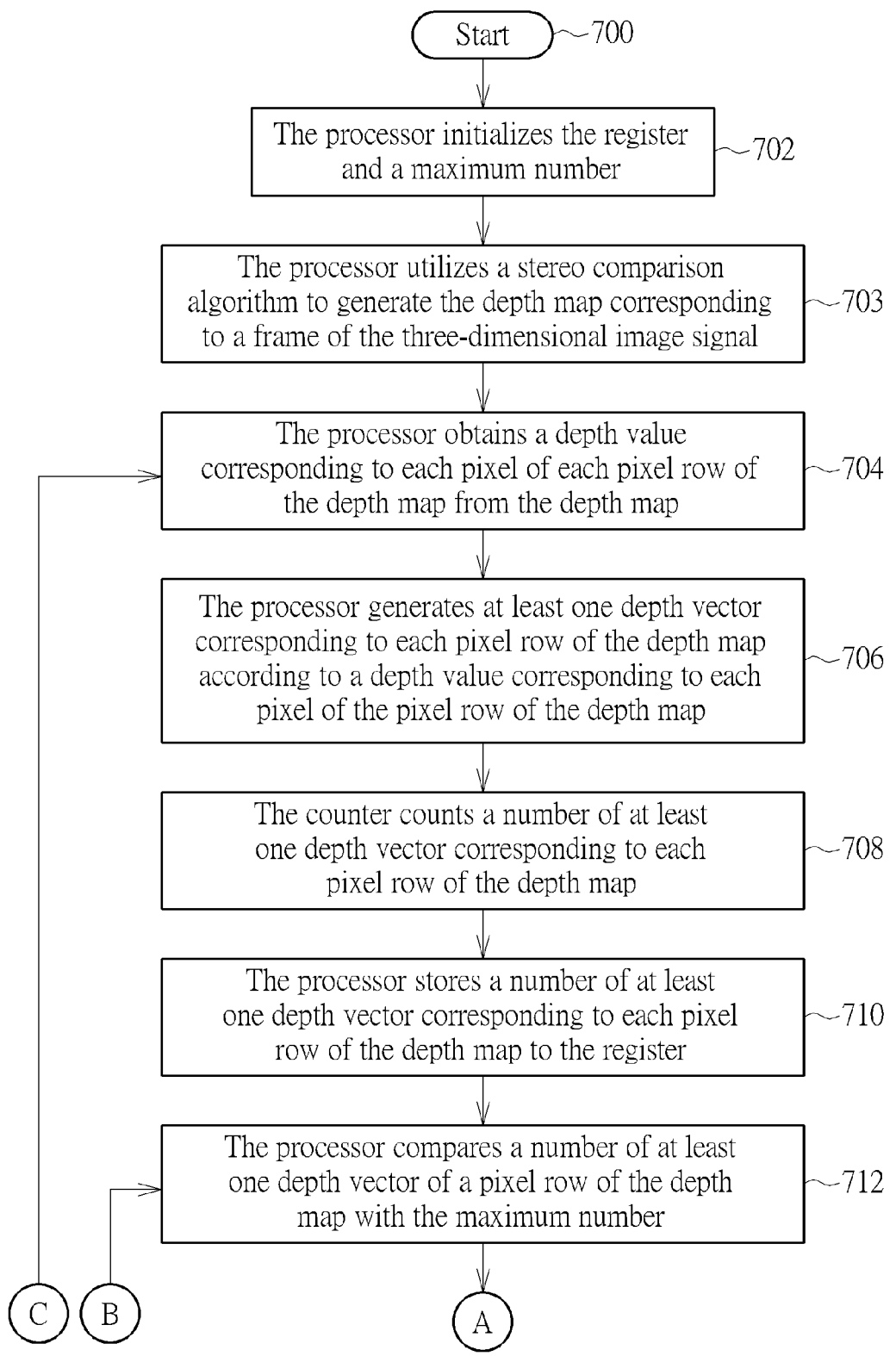
FIG. 7A and FIG. 7B are flowcharts illustrating a method of storing a content of a three-dimensional image according to another embodiment.
Figure 7B:
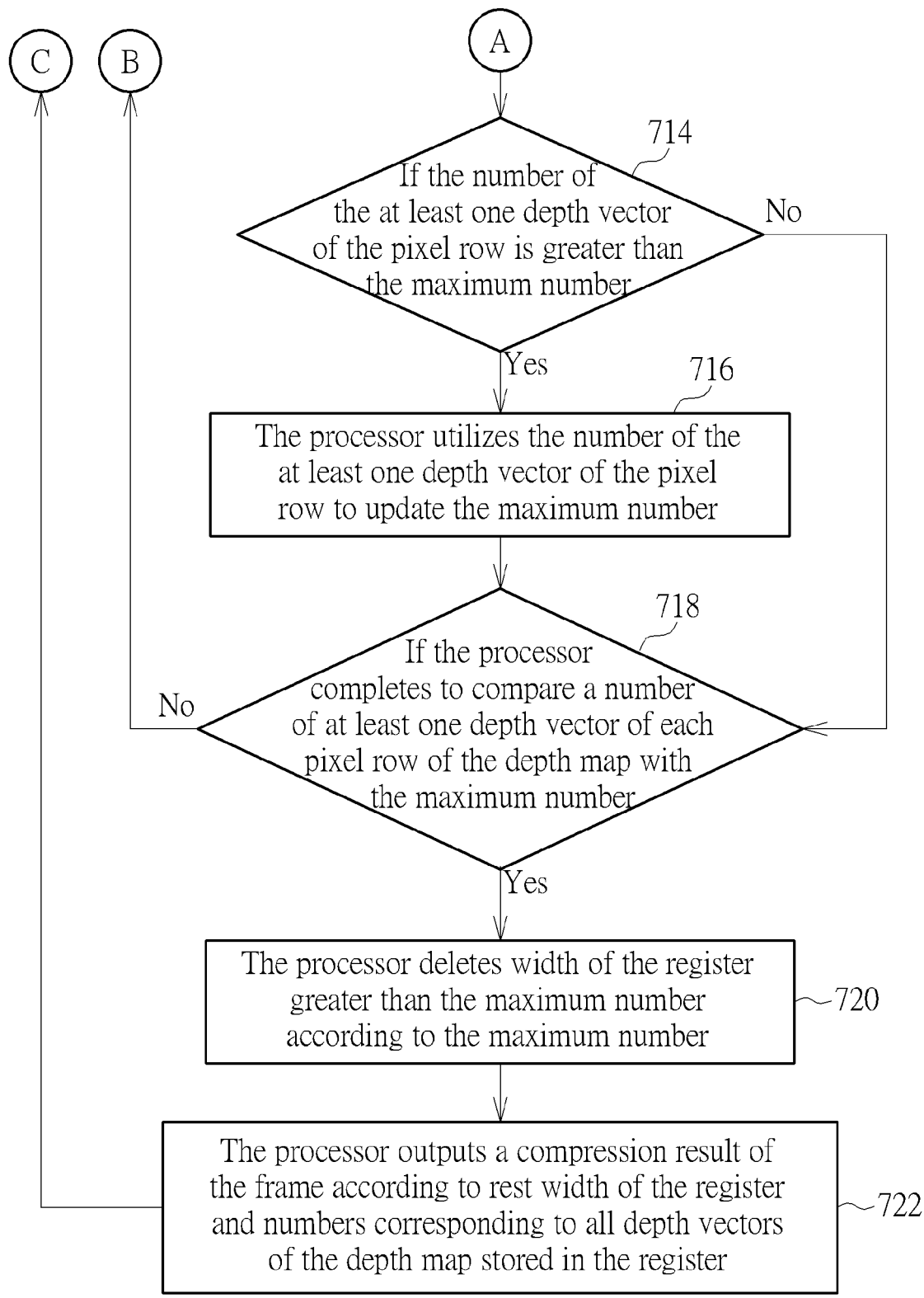
Figure 8:
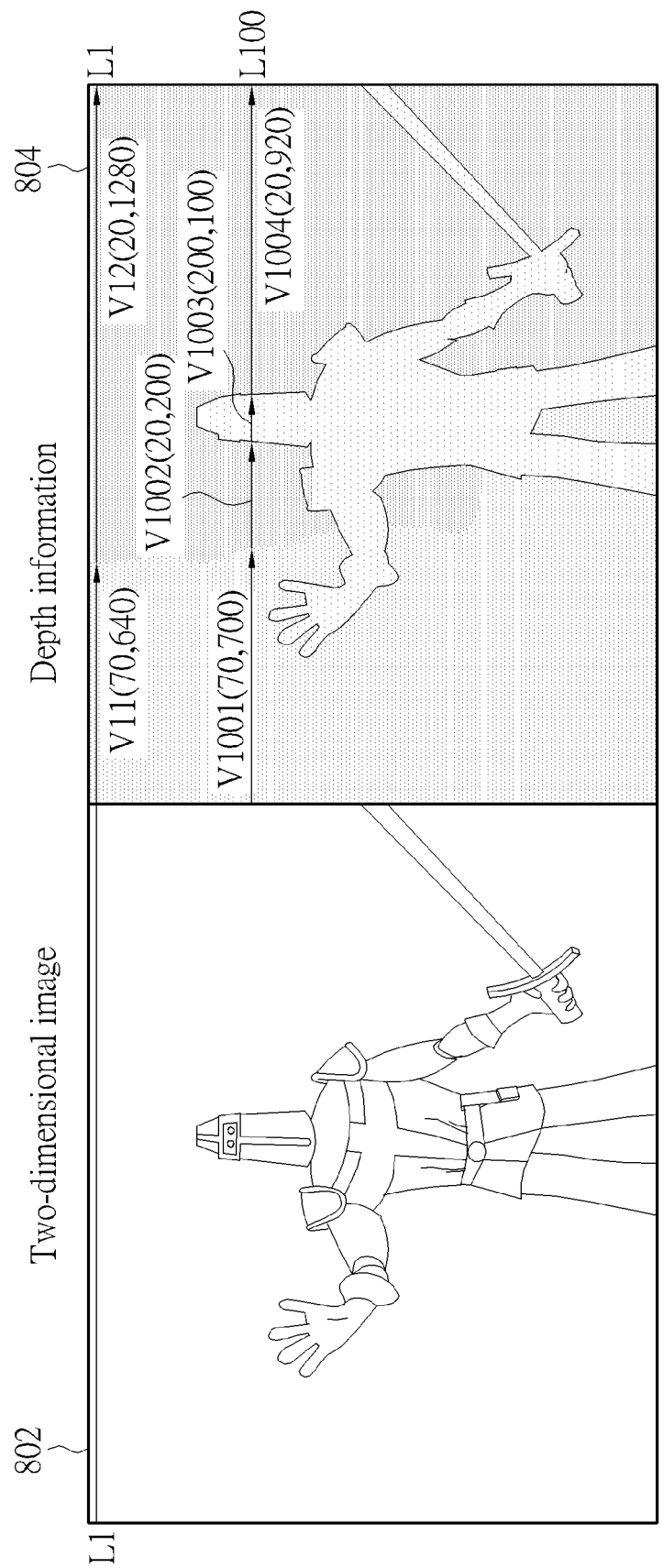
FIG. 8 is a diagram illustrating a two-dimensional image and a depth information map corresponding to a frame of a three-dimensional image signal.

Please refer to FIG. 6, FIG. 7A, FIG. 7B, and FIG. 8. FIG. 6 is a diagram illustrating a device 600 for storing a content of a three-dimensional image according to an embodiment, FIG. 7A and FIG. 7B are flowcharts illustrating a method of storing a content of a three-dimensional image according to another embodiment, and FIG. 8 is a diagram illustrating a two-dimensional image 802 and a depth information map 804 corresponding to a frame of a three-dimensional image signal IS. As shown in FIG. 6, the device 600 includes a register 602, a processor 604, and a counter 606. In addition, detailed steps of the method in FIG. 7A and FIG. 7B are as follows:

Step 700: Start.

Step 702: The processor 604 initializes the register 602 and a maximum number MU.

Step 703: The processor 604 utilizes a stereo comparison algorithm to generate the depth information map 804 corresponding to a frame of the three-dimensional image signal IS.

Step 704: The processor 604 obtains a depth value corresponding to each pixel of each pixel row of the depth information map 804 from the depth information map 804.

Step 706: The processor 604 generates at least one depth vector corresponding to each pixel row of the depth information map 804 according to a depth value corresponding to each pixel of the pixel row of the depth information map 804.

Step 708: The counter 606 counts a number of at least one depth vector corresponding to each pixel row of the depth information map 804.

Step 710: The processor 604 stores a number of at least one depth vector corresponding to each pixel row of the depth information map 804 to the register 606.

Step 712: The processor 604 compares a number of at least one depth vector of a pixel row of the depth information map 804 with the maximum number MU.

Step 714: If the number of the at least one depth vector of the pixel row is greater than the maximum number MU; if yes, go to Step 716; if no, go to Step 718.

Step 716: The processor 604 utilizes the number of the at least one depth vector of the pixel row to update the maximum number MU.

Step 718: If the processor 604 completes to compare a number of at least one depth vector of each pixel row of the depth information map 804 with the maximum number MU; if yes, go to Step 720; if no, go to Step 712.

Step 720: The processor 604 deletes width of the register 602 greater than the maximum number MU according to the maximum number MU.

Step 722: The processor 604 outputs a compression result of the frame according to rest width of the register 602 and numbers corresponding to all depth vectors of the depth information map 804 stored in the register 602, go to Step 704.

In Step 702, the processor 604 initials size of the register 602 to be equal to size of the depth information map 804 of the frame, where length of a horizontal side of the depth information map 804 is equal to 1920 pixels. But, the present invention is not limited to the length of the horizontal side of the depth information map 804 being equal to 1920 pixels. In addition, the processor 604 also initials the maximum number MU (e.g. the processor 604 can set the maximum number MU to be 0), where the maximum number MU is stored in the counter 606.

In Step 703, if the three-dimensional image signal IS has a side-by-side three-dimensional image format, the processor 604 can first generate the depth information map 804 corresponding to each frame of the three-dimensional image signal IS according to the side-by-side three-dimensional image format and the stereo comparison algorithm; if the three-dimensional image signal IS has a top-and-bottom three-dimensional image format, the processor 604 can first generate the depth information map 804 corresponding to each frame of the three-dimensional image signal IS according to the top-and-bottom three-dimensional image format and the stereo comparison algorithm; and if the three-dimensional image signal IS has a frame packing three-dimensional image format, the processor 604 can first generate the depth information map 804 corresponding to each frame of the three-dimensional image signal IS according to the frame packing three-dimensional image format and the stereo comparison algorithm.

In Step 704, the processor 604 obtains a depth value corresponding to each pixel of each pixel row of the depth information map 804 from the depth information map 804 (that is, a gray-level value corresponding to each pixel of each pixel row of the depth information map 804).

In Step 706, the processor 604 generates at least one depth vector corresponding to each pixel row of the depth information map 804 according to a depth value corresponding to each pixel of each pixel row of the depth information map 804, where each depth vector of the at least one depth vector includes at least one pixel, and each pixel of at least one pixel of each depth vector of the at least one depth vector has the same depth value.

As shown in FIG. 8, the processor 604 generates two depth vectors V11, V12 corresponding to a first pixel row L1 of the depth information map 804 according to a depth value corresponding to each pixel of the first pixel row L1 of the depth information map 804, where a depth value of the depth vector V11 is 70 and the depth vector V11 includes 640 pixels, so the depth vector V11 can be represented as (70, 640); and a depth value of the depth vector V12 is 20 and the depth vector V12 includes 1280 pixels, so the depth vector V12 can be represented as (20, 1280). That is, the first pixel row L1 of the depth information map 804 can be represented by the depth vectors V11, V12. Similarly, the processor 604 can also generate four depth vectors V1001, V1002, V1003, V1004 corresponding to a $100^{th}$ pixel row L100 of the depth information map 804 according to a depth value corresponding to each pixel of the $100^{th}$ pixel row L100 of the depth information map 804, where the depth vector V1001 can be represented as (70, 700), the depth vector V1002 can be represented as (20, 200), the depth vector V1003 can be represented as (200, 100), and the depth vector V1004 can be represented as (20, 920). That is, the $100^{th}$ pixel row L100 of the depth information map 804 can be represented by the four depth vectors V1001, V1002, V1003, V1004. In addition, the processor 604 can also utilize the above mentioned method to represent other pixel rows of the depth information map 804, so further description thereof is omitted for simplicity. In Step 708, the counter 606 counts a number of at least one depth vector of each pixel row of the depth information map 804. Then, in Step 710, the processor 604 stores a number of at least one depth vector of each pixel row of the depth information map 804 to the register 606. In Step 712, the processor 604 compares a number of at least one depth vector of a pixel row of the depth information map 804 with the maximum number MU. For example, the processor 604 starts to compares a number of at least one depth vector of the first pixel row L1 of the depth information map 804 (because the first pixel row L1 includes the depth vectors V11, V12, the number of at least one depth vector of the first pixel row L1 is 2) with the maximum number MU (e.g. an initial value of the maximum number MU is 0). In Step 714, because the number (2) of at least one depth vector of the first pixel row L1 is greater than the maximum number MU (e.g. 0), go to Step 716. In Step 716, because the number (2) of at least one depth vector of the first pixel row L1 is greater than the maximum number MU (e.g. 0), the processor 604 utilizes the depth vector number (2) of the first pixel row L1 to update the maximum number MU (e.g. 0). That is, the maximum number MU is changed to 2. In Step 718, because the processor 604 does not yet compare other pixel rows of the depth information map 804, go to Step 712. Thus, the processor 604 can execute Step 712 to Step 720 repeatedly until the processor 604 completes to compare a number of at least one depth vector of each pixel row of the depth information map 804 with the maximum number MU.

In Step 720, after the processor 604 completes to compare a number of at least one depth vector of each pixel row of the depth information map 804 with the maximum number MU, the processor 604 deletes the width of the register 602 greater than the maximum number MU according to the maximum number MU. For example, if the length of the horizontal side of the depth information map 804 is 1920 pixels and the maximum number MU is 100, so the processor 604 can delete the width of the register 602 greater than the maximum number MU. In Step 722, the processor 604 outputs the compression result of the frame according to the rest width of the register 602 (e.g. 100 pixel) and the numbers corresponding to all depth vectors of the depth information map 804 stored in the register 602. Taking a first pixel row L1 of the two-dimensional image 802 and the first pixel row L1 of the depth information map 804 as an example, because the first pixel row L1 of the two-dimensional image 802 and the first pixel row L1 of the depth information map 804 have 1920 pixels respectively and each pixel has red, green, blue sub-pixels, the prior art needs 11520 ((1920+1920)×3) bits to store the first pixel row L1 of the two-dimensional image 802 and the first pixel row L1 of the depth information map 804; and because the first pixel row L1 of the depth information map 804 can be represented by the depth vectors V11, V12 according to the present invention, the present invention only needs 5766 ((1920+2)×3) bits to store the first pixel row L1 of the two-dimensional image 802 and the first pixel row L1 of the depth information map 804. Therefore, a compression ratio of the first pixel row L1 of the two-dimensional image 802 and the first pixel row L1 of the depth information map 804 is 49.94% ((11520−5766)/11520).

To sum up, the method of storing a content of a three-dimensional image utilizes the processor to obtain a depth value corresponding to each pixel of each pixel row of a depth information map corresponding to each frame of a three-dimensional image signal, and generate at least one depth vector corresponding to each pixel row of the depth information map according to a depth value corresponding to each pixel of each pixel row of the depth information map. Compared to the prior art, because each pixel row of the depth information map of the present invention can be represented by at least one depth vector, the present invention can significantly compress bits for storing the depth information map to reduce cost of storing a content of a three-dimensional image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of storing a content of a three-dimensional image, the method comprising the following steps:
   a processor initializing a register and a maximum number;
   the processor utilizing a stereo comparison algorithm to generate a depth information map corresponding to each frame of a three-dimensional image signal;
   the processor obtaining a depth value corresponding to each pixel of each pixel row of the depth information map from the depth information map corresponding to the frame of the three-dimensional image signal;
   the processor generating at least one depth vector corresponding to the pixel row according to a depth value corresponding to each pixel of the pixel row, wherein each depth vector of the at least one depth vector comprises at least one pixel, and each pixel of the at least one pixel has the same depth value;
   a counter counting a number of the at least one depth vector;
   the processor storing the number of the at least one depth vector to the register;
   the processor comparing the number of the at least one depth vector with the maximum number;
   the processor utilizing the number of the at least one depth vector to update the maximum number when the number of the at least one depth vector is greater than the maximum number;
   the processor deleting width of the register greater than a current maximum number according to the current maximum number to generate rest width of the register after the processor completes to compare a number of at least one depth vector of each pixel row of the depth information map; and
   the processor outputting a compression result of the frame according to the rest width of the register and numbers corresponding to all depth vectors of the depth information map stored in the register.

2. The method of claim 1, wherein the processor initializing the register is the processor initializing size of the register to be equal to size of the depth information map of the frame.

3. The method of claim 1, further comprising the following step:
   the processor generating a depth information map corresponding to each frame of the three-dimensional image signal according to a side-by-side three-dimensional image format when the three-dimensional image signal has the side-by-side three-dimensional image format.

4. The method of claim 1, further comprising the following step:
   the processor generating a depth information map corresponding to each frame of the three-dimensional image signal according to a top-and-bottom three-dimensional image format when the three-dimensional image signal has the top-and-bottom three-dimensional image format.

5. The method of claim 1, further comprising the following step:

the processor generating a depth information map corresponding to each frame of the three-dimensional image signal according to a frame packing three-dimensional image format when the three-dimensional image signal has the frame packing three-dimensional image format.

* * * * *